(12) United States Patent
Lee et al.

(10) Patent No.: US 8,503,760 B2
(45) Date of Patent: Aug. 6, 2013

(54) SYSTEM AND METHOD FOR REAL-TIME OBJECT RECOGNITION AND POSE ESTIMATION USING IN-SITU MONITORING

(75) Inventors: Sukhan Lee, Gyeonggi-do (KR); Seung-Min Baek, Gyeonggi-do (KR); Jeihun Lee, Seoul (KR); Jangwon Lee, Seoul (KR)

(73) Assignee: Sungkyunkwan University Foundation for Corporate Collaboration, Gyeonggi-Do (KR)

( * ) Notice: Subject to any disclaimer, the term of this patent is extended or adjusted under 35 U.S.C. 154(b) by 1153 days.

(21) Appl. No.: 12/032,427

(22) Filed: Feb. 15, 2008

(65) Prior Publication Data

US 2009/0190798 A1    Jul. 30, 2009

(30) Foreign Application Priority Data

Jan. 25, 2008    (KR) .................. 10-2008-0008162

(51) Int. Cl.
*G06K 9/00*    (2006.01)
(52) U.S. Cl.
USPC ............ 382/154; 382/103; 359/627; 380/242
(58) Field of Classification Search
USPC ................. 382/103; 380/242; 455/3, 436
See application file for complete search history.

(56) References Cited

U.S. PATENT DOCUMENTS

| | | | | | |
|---|---|---|---|---|---|
| 5,990,900 | A | * | 11/1999 | Seago | 345/427 |
| 6,499,025 | B1 | * | 12/2002 | Horvitz et al. | 706/52 |
| 6,956,569 | B1 | * | 10/2005 | Roy et al. | 345/426 |
| 7,450,736 | B2 | * | 11/2008 | Yang et al. | 382/103 |
| 7,715,619 | B2 | * | 5/2010 | Hamanaka | 382/154 |
| 7,809,159 | B2 | * | 10/2010 | Ishiyama | 382/103 |
| 7,940,957 | B2 | * | 5/2011 | Ikenoue et al. | 382/103 |
| 2003/0123713 | A1 | * | 7/2003 | Geng | 382/118 |
| 2006/0285755 | A1 | * | 12/2006 | Hager et al. | 382/224 |
| 2007/0061043 | A1 | * | 3/2007 | Ermakov et al. | 700/263 |
| 2007/0127816 | A1 | * | 6/2007 | Balslev et al. | 382/181 |
| 2007/0183670 | A1 | * | 8/2007 | Owechko et al. | 382/224 |
| 2007/0286475 | A1 | * | 12/2007 | Sekiguchi | 382/154 |
| 2008/0063236 | A1 | * | 3/2008 | Ikenoue et al. | 382/103 |
| 2009/0088897 | A1 | * | 4/2009 | Zhao et al. | 700/250 |

* cited by examiner

*Primary Examiner* — Vu Le
*Assistant Examiner* — Aklilu Woldemariam
(74) *Attorney, Agent, or Firm* — Rabin & Berdo, P.C.

(57) ABSTRACT

Provided are a system and method for real-time object recognition and pose estimation using in-situ monitoring. The method includes the steps of: a) receiving 2D and 3D image information, extracting evidences from the received 2D and 3D image information, recognizing an object by comparing the evidences with model, and expressing locations and poses by probabilistic particles; b) probabilistically fusing various locations and poses and finally determining a location and a pose by filtering inaccurate information; c) generating ROI by receiving 2D and 3D image information and the location and pose from the step b) and collecting and calculating environmental information; d) selecting an evidence or a set of evidences probabilistically by receiving the information from the step c) and proposing a cognitive action of a robot for collecting additional evidence; and e) repeating the steps a) and b) and the steps c) and d) in parallel until a result of object recognition and pose estimation is probabilistically satisfied.

23 Claims, 12 Drawing Sheets

(10 of 12 Drawing Sheet(s) Filed in Color)

SYSTEM AND METHOD FOR REAL-TIME OBJECT RECOGNITION AND POSE ESTIMATION USING IN-SITU MONITORING

The present application claims priority under 35 U.S.C. 119 to Korean Patent Application No. 10-2008-0008162 (filed on Jan. 25, 2008), which is hereby incorporated by reference in its entirety.

TECHNICAL FIELD

The present invention relates to a system and method for real-time object recognition and pose estimation using in-situ monitoring and, more particularly, to a system and method for real-time object recognition and pose estimation using in-situ monitoring, which recognizes a pose and a location of an object robustly from environmental variations by receiving two dimensional or three dimensional image information.

BACKGROUND

The object recognition has been on of the major problems in computer vision.

There are several approaches to solve the problems about object recognition in real environment. One of the most common approaches for recognizing object from a measured scene is a model based recognition method. It recognizes the objects by matching features extracted from the scene with stored feature of the object. The model based recognition method was introduced in an article by M. F. S. Farias et. al., entitled "Multi-view Technique For 3D Polyhedral Object Rocognition Using Surface Representation", Revista Controle & Automacao., pp. 107-117, 1999, in an article by Y. Shirai, entitled "Three-Dimensional Computer Vision" New York: Springer Verlag, and an article by J. Ben-Arie et. al., "Iconic recognition with affine-invariant spectral", In Proc. IAPR-IEEE International Conference on Pattern an Recognition, volume 1, pp. 672-676, 1996. Furthermore, there were several methods introduced to recognize object using pre-defined model information.

Fischler and Bolles introduced a method for recognizing an object using RANSAC in an article entitled "Random sample consensus: A paradigm for model fitting with applications to image analysis and automated cartography" in Comm. Assoc. Comp. Mach, 24(6):381-395, 1981. In the method, all points on a scene are projected and it is determined if projected points are close to those of detected scene. Then, an object is recognized based on the determination result. This method is not so efficient because of iterative hypothesis and verification tasks. Olson proposed pose clustering method for object recognition in an article entitled "Efficient pose clustering using a randomized algorithm" in IJCV, 23(2):131-147, June 1997. As for disadvantages of this method, data size is quite big because pose space is 6-dimensional and pose cluster can be detected only when sufficient accurate pose becomes generated. David et al. also proposed recognition method in an article entitled "Softposit: Simultaneous pose and correspondence determination" 7th ECCV, volume III, pages 698-703, Copenhagen, Denmark, May 2002. In David's recognition method, matching and pose estimation are solved simultaneously by minimizing energy function. But it may not be converged to minimum value by functional minimization method due to high non-linearity of cost function.

In addition, Johnson and Herbert proposed a spin image based recognition algorithm in cluttered 3D scenes in an article entitled "Using spin images for efficient object recognition in cluttered 3D scenes", IEEE Transactions on Pattern Analysis and Machine Intelligence, vol. 21, May 1999. Furthermore, Andrea Frome et al. compared the performance of 3D shape context with spin-image in an article entitled "Recognizing Objects in Range Data Using Regional Point Descriptors", European Conference on Computer Vision, Prague, Czech Republic, 2004. Jean Ponce et al. introduced 3D object recognition approach using affine invariant patches in an article entitled "3D Object Modeling and Recognition Using Affine-Invariant Patches and Multi-View Spatial Constraints", CVPR, volume 2, pp. 272-280, 2003. Most recently, several authors have proposed the use of descriptor in image patch in an article, for example, by D. Lowe, entitled "Object recognition from local scale invariant features", Proc. 7th International Conf. Computer Vision (ICCV' 99), pp. 1150.1157, Kerkyra, Greece, September 1999.

Another approach to recognize an object is a local shape features based method which is inspired by the shape context of Belongie et al. in an article "Shape matching and object recognition using shape contexts", IEEE Trans. On Pattern Analysis and Machine Intelligence, 24(4):509-522, April 2002. Owen Carmichael et al. introduced another recognition method in an article entitled "Shape-Based Recognition of Wiry Object", IEEE PAMI, May 2004. In this method, a histogram or shape context is calculated at each edge pixel in an image. Then, each bin in the histogram counts the number of edge pixels in a neighborhood near the pixel. After searching nearest neighbor and measuring histogram distance, the method determines correspondences between shape contexts from a text image and shape contexts from model images. But this method may not be effective when the background is concerned. To solve this problem, assessing shape context matching in high cluttered scene have studied by A. Thayananthan et al. in an article entitled "Shape context and chamfer matching in cluttered scenes" Proc. IEEE Conference On Computer Vision and Pattern Recognition, 2003.

Except for the above methods, there were many of object recognition researches introduced. However, most of these methods are working well only at the condition under accurate 3D data or fully textured environments in single scene information with limited feature.

SUMMARY

Embodiments have been proposed to provide a system and method for real time object recognition and pose estimation using in-situ monitoring, which overcomes problems caused by many noises and uncertainty from a low quality sensor and robustly recognizes an object and estimates a pose thereof by employing a probabilistic method of a particle based filtering using continuous image information of various view points.

In embodiments, a method for real time object recognition and pose estimation using in-situ monitoring includes the steps of: a) receiving 2D and 3D real time image information, extracting single or multiple evidences from the received 2D and 3D real time image information, recognizing an object by comparing the extracted evidences with model information, and expressing locations and poses of the object by probabilistic particles in a space; b) probabilistically fusing various locations and poses of the object, which are generated in a particle form, and finally determining a location and a pose of the object by filtering inaccurate information; c) generating a region of interest (ROI) by receiving 2D and 3D real time image information and the location and pose of the object from the step b) and collecting and calculating real time environmental information; d) selecting an evidence or a set of evidences probabilistically by receiving the information from the step c) and proposing a cognitive action of a robot for collecting additional evidence if selected evidence is not sufficient; and e) repeating the steps a) and b) and the steps c) and d) in parallel until a result of object recognition and pose estimation is probabilistically satisfied.

The evidence may be a feature obtained from image information or a combination of two or more features, where the feature is color, line, and scale invariant feature transform (SIFT).

The step b) may include the steps of: b-1) generating an observation likelihood from the pose generated using various evidences at the step a); b-2) estimating particles denoting poses of the object by propagating particles from a previous state using motion information and updating the estimated particles by the observation likelihood; and b-3) re-sampling the particles according to a weight for expressing particles with different weights fused in the step b-2) as particles with uniform weights.

In the step c), a result of the step b) may be received, a ROI may be generated from an input image, and illumination, texture density, and a distance between a robot and an expected object in the generated ROI may be calculated In the step d), a best evidence for object recognition and pose estimation may be selected using information about the illumination, the texture density, and the distance between a robot and an expected object, which are collected in the step c).

In another embodiment, a system for real time object recognition and pose estimation using in-situ monitoring, may include: an image capturing unit for continuously capturing an object to recognize with a real peripheral environment in various view points; a real time environment monitoring unit for receiving 2D and 3D image information from the image capturing unit and calculating and collecting real time environmental information; a multiple evidence extracting unit for extracting various evidences from the real time image information and generating various locations and poses of the object by comparing the extracted evidences with model information; an evidence selecting and collecting unit for selecting a best evidence for the object and the peripheral environment thereof using the real time environmental information and the model information and proposing a predetermined action of a robot for collecting additional evidences; and a probabilistic information fusion unit for estimating a location and a pose of the object through particle filtering of the various generated locations and poses and expressing the estimated location and pose in arbitrary distribution of particles.

DRAWINGS

The patent or application file contains at least one drawings executed in color. Copies of this patent or patent application publication with color drawings will be provided by the Office upon request and payment of the necessary fee.

DESCRIPTION

Hereinafter, embodiments of the present invention will be described in detail with reference to the accompanying drawings.

Figure 1:
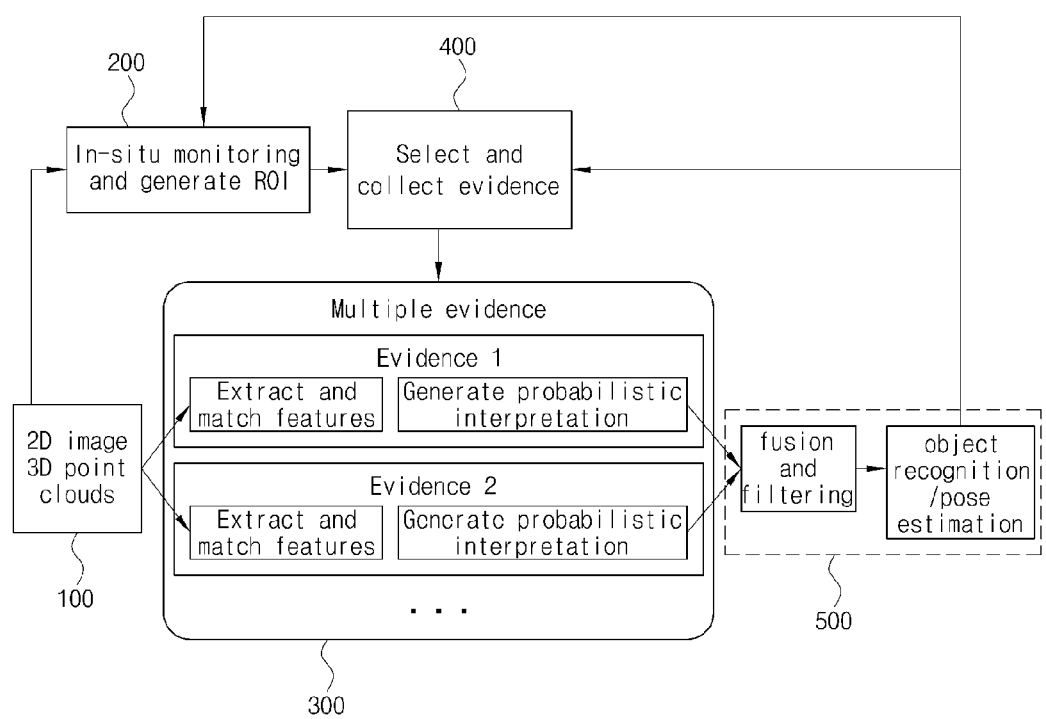
FIG. 1 is a diagram illustrating a system for real time object recognition and pose estimation using in-situ monitoring in accordance with an embodiment of the present invention.

FIG. 1 is a diagram illustrating a system for real time object recognition and pose estimation using in-situ monitoring in accordance with an embodiment of the present invention.

The system according to the present embodiment shown in FIG. 1 is mounted in a service robot and performs object recognition and pose estimation in a robot vision.

As shown in FIG. 1, the system according to the present embodiment includes an image capturing unit 100, a real time environment monitoring unit 200, a multiple evidence extracting unit 300, an evidence selecting and collecting unit 400, and a probabilistic information fusion unit 500.

The image capturing unit 100 obtains two dimensional (2D) or three dimensional (3D) image information by continuously photographing scenes of an object to recognize in a real environment. The image capturing unit 100 of the present embodiment is not limited to a particular configuration. For example, the image capturing unit 100 may be a video stereo camera that cannot provide accurate 3D data.

The real time environment monitoring unit 200 receives 2D and 3D image information provided from the image capturing unit 100, calculates and collects real time environmental information.

The multiple evidence extracting unit 300 receives real time image information from the image capturing unit 100, extracts various evidences from the received image information, compares the extracted evidences with those of model, and generates various locations and poses of the object based on the comparison results. At the same time, the multiple evidence extracting unit 300 receives the selected evidence from the evidence selecting and collecting unit 400 and corrects the generated location and pose of the object based on the selected evidence.

The evidence selecting and collecting unit 400 selects evidences proper to the object and the corresponding environment using real time environment information from the real time environment monitoring unit 300 and model information and proposes additional actions of a robot to collect evidences.

The probabilistic information fusion unit 500 estimates a location and a pose of the object through particle filtering of the various generated poses and locations of the object from the multiple evidence extracting unit 300 and expresses the estimated location and pose of the object in arbitrary distribution of particles.

Figure 2:
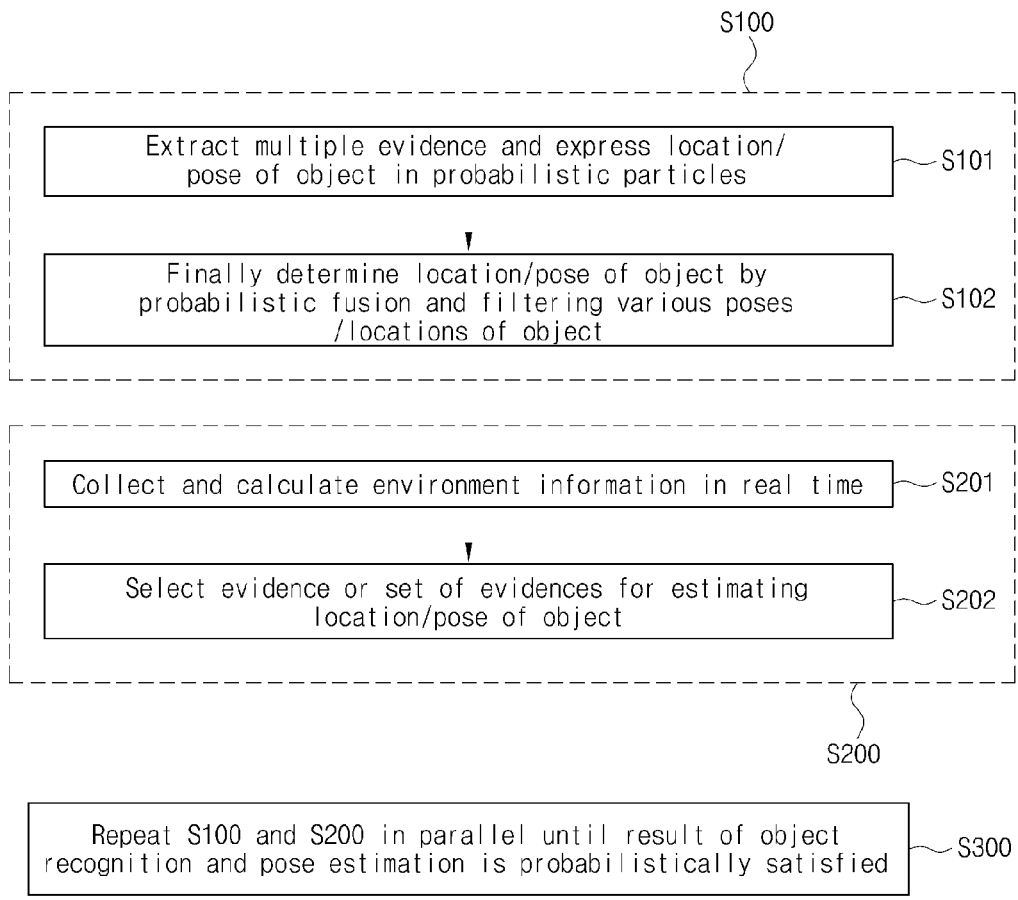
FIG. 2 is a flowchart illustrating a method for real time object recognition and pose estimation using an in-situ monitoring in accordance with an embodiment of the present invention.

FIG. 2 is a flowchart illustrating a method for real time object recognition and pose estimation using an in-situ monitoring in accordance with an embodiment of the present invention.

As shown in FIG. 2, the method for real time object recognition and pose estimation using in-situ monitoring according to the present embodiment performs following operations. At step S101, an object is recognized from real time image information and locations and poses of the recognized object are expressed in particles. At step S102, location and pose are estimated through particle filtering of the various locations and poses of the object generated in the step S101, and the estimated location and pose of the object are expressed in arbitrary distribution of particles. At step S201, real time environment information is collected and calculated using real time image information and information about the location and pose of the object generated in the step S102. At step S202, evidence or a set of evidences is probabilistically selected from the information in the step S201. At step S300, the steps S101 and S102, and the steps S201 and S202 are performed in parallel until object recognition and pose estimation results are probabilistically satisfied.

In detail, the multiple evidence extracting unit 300 receives 2D and 3D image information from the image capturing unit 100 in real time, extracts one or more evidences from the received image information, compares the extracted evidence with model information, recognizes the object based on the comparison result, and expresses locations and poses of the object in spatial probabilistic particles at the step S101. Also, the multiple evidence extracting unit 300 expresses the locations and poses of the object in particles using the selected evidence by the evidence selecting and collecting unit 400 at step S202. The evidence is features obtained from image information, such as color, line, or scale invariant feature transform (SIFT), and combination thereof.

A method for expressing a location and a pose of an object based on the extracted evidence generates a location and pose of an object according to a feature to be used as follows.

In case of using a line feature among the extracted evidences, all of lines are extracted from the received 2D image. The extracted 2D lines are transformed to 3D lines by mapping 3D points corresponding to the extracted 2D lines. The 3D lines are compared with 3D line information of model stored in a database, and various locations and poses of the object are generated based on the comparison result. In order to extract all of lines from 2D image to generate poses of the object, edges are drawn based on a canny edge algorithm and the drawn edges are classified into horizontal line segments, vertical line segments, and diagonal line segments based on relations between the drawn edges. Then, 2D lines are extracted by connecting each of line segments to adjacent line segment based on an aliasing problem of lines in two-dimension. If there are 3D points corresponding to pixels of the extracted 2D lines, 3D lines can be obtained. Meanwhile, the object to recognize can be expressed as a set of 3D lines defined in the database. It is possible to effectively find poses that can be generated at near 3D lines in a scene using salient lines of models stored in the database based on two parameters of orientation and relationship.

In case of using the SIFT feature among the extracted features, a location and a pose of the object can be generated by calculating transformation between SIFT features measured in a current frame and corresponding SIFT features in a database. The transformation may be expressed by a homogeneous transform matrix. In detail, a feature distance between SIFT features from a scene and SIFT features from the object is calculated. Then, features having similar characteristics are excluded. If there are three or more corresponding features, a pose of the object can be generated using three dimension location from a depth image.

Meanwhile, an object having a predetermined color may be segmented by the color in a current scene. Although a segmented region cannot provide orientation of the object, it is possible to generate a location of the object using the segmented region and a depth image. Since it is impossible to estimate a pose of an object only with color information as described above, the color information can be used to generate a location and a pose of an object by combining the color information with the other features. In case of using various features by combining more than two features together, various features extracted from a current input image are compared with features of model stored in a database, and various locations and poses of the object can be generated based on the comparison result.

Then, the probabilistic information fusion unit 500 finally estimates a location and a pose of the object by probabilistically fusing the various locations and poses generated in particle formation at the step S101 and filtering inaccurate information thereof in the step S102. In the step S102, the probabilistic information fusion unit 500 performs following operations. As a first step S2-1, the probabilistic information fusion unit 500 generates observation likelihood from the generated poses using various evidences in the step S101. Then, the probabilistic information fusion unit 500 estimates a pose of the object by propagating particles expressing the pose from a previous state using motion information and updates the estimated particles based on the observation likelihood at a second step S2-2. At a third step S2-3, the probabilistic information fusion unit 500 performs re-sampling of particles according to a weight in order to express particles having different weights fused in the second step S2-2 as particles having uniform weight.

Figure 3:
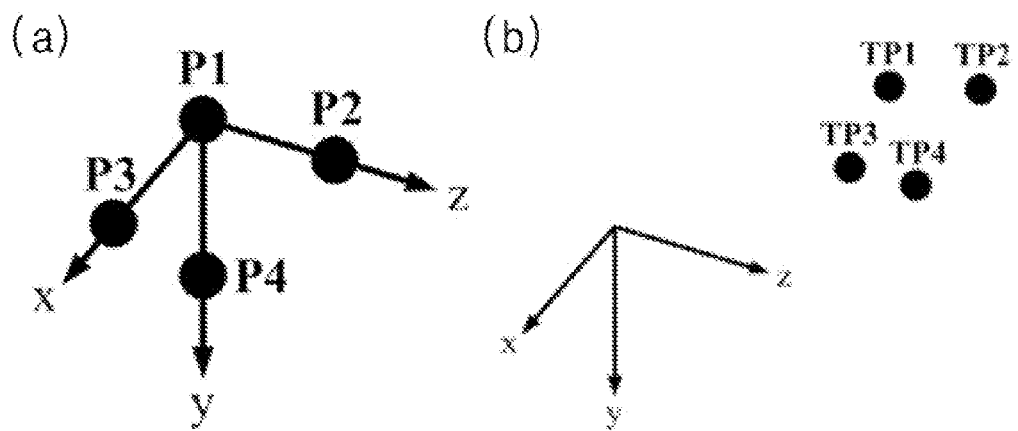
FIG. 3 is a diagram illustrating designated four points for generating observation likelihood.

In the first step S2-1, the observation likelihood is generated as follows. FIG. 3 is a diagram illustrating designated four points for generating observation likelihood. As shown in a diagram a) in FIG. 3, four points P1, P2, P3, and P4 are designated in camera frame. The designated four points are transformed by a homogeneous transform matrix parameterized by the six spatial degrees of freedom. A diagram b) of FIG. 3 shows the transformed points TP1, TP2, TP3, and TP4. A set of four points TP1, TP2, TP3, and TP4 transformed from the points P1, P2, P3, and P4 can be obtained using a homogeneous transform matrix $\{O^{[1]}, \ldots, O^{[m]}\}$ forming various poses of the object in a current frame and a homogeneous transform matrix $\{O_t^{[1]}, \ldots, O_t^{[k]}\}$ representing prior particles. It is assumed that $\{Ob\_TP1[i], Ob\_TP2[i], Ob\_TP3[i], Ob\_TP4[i]\}$ denotes the transformed four points representing $O^{[i]}$, and $\{St\_TP1[i], St\_TP2[i], St\_TP3[i], St\_TP4[i]\}$ denotes the transformed four points that represents t[i] Then, the observation likelihood $p(Z_t|O_T^{[i]})$ can be defined as Eq. 1 using Mahalanobis distance metric.

$$p(Z_t | O_t^{[i]}) = \sum_{j=1}^{m} w_j \cdot \exp\left[\frac{-1}{2} \cdot \sum_{i=1}^{4}\left\{ \times S_t^{-1} \cdot \begin{matrix}(Ob\_TP_t^j - St\_TP_t^j)^T \\ (Ob\_TP_t^j - St\_TP_t^j)\end{matrix}\right\}\right] \quad \text{Eq. 1}$$

In Eq. 1, $O^{[j]}$ is a homogeneous transform matrix denoting a pose of an object generated from an observation time t. $O_t^{[i]}$ is a homogeneous transform matrix denoting a pose of an object, which is estimated from a time t−1 to a time t. $w_j$ is a similarity weight for $O^{[j]}$ which is particle generated from an observation at time t. m denotes the number of particles generated at an observation time t. $\{Ob\_TP_1^j, Ob\_TP_2^j, Ob\_TP_3^j, Ob\_TP_4^j\}$ denotes transformed four points expressing $O^{[j]}$. $\{St\_TP_1^i, St\_TP_2^i, St\_TP_3^i, St\_TP_4^i\}$ denotes transformed four points expressing $O^{[i]}$. $S_j$ denotes a matching error covariance for points that express $O^{[j]}$.

The four points designated to generate the observation likelihood are used not only for representing a location of the object but also for representing orientation of the object. If an observation measures only a location of an object, one point transformed from an origin in a camera frame may be used. Although particles extracted from state and features are expressed as a homogeneous transform matrix as described above, an observation likelihood can be easily calculated by a Mahalanobis distance metric between points.

In Eq. 1, the matching error covariance $S_j$ is a factor for correcting a pose of the object through particle filtering. The matching error covariance $S_j$ is calculated as follows. That is, it is assumed that P1, P2, and P3 are points measured from a current frame, and TP1, TP2, and TP3 are points transformed from points in a database, which are corresponding to the points P1, P2, and P3, using the homogeneous transform matrix. In this case, a matching error $e_i$ of each point can be expressed as Eq. 2.

$$e_i = \begin{bmatrix} P_i(x) \\ P_i(y) \\ P_i(z) \end{bmatrix} - \begin{bmatrix} TP_i(x) \\ TP_i(y) \\ TP_i(z) \end{bmatrix} = \begin{bmatrix} \Delta x_i \\ \Delta y_i \\ \Delta z_i \end{bmatrix} \qquad \text{Eq. 2}$$

In Eq. 2, x, y, and z denote a coordinate of 3 D location.

A matching error covariance $S_j$ for the $j^{th}$ pose of the object can be expressed as Eq. 3.

$$S_j = \frac{1}{n} \sum_{i=1}^{n} e_i e_i^T \qquad \text{Eq. 3}$$

In Eq. 3, n denotes the number of corresponding points.

Meanwhile, the similarity weight $w_j$ in Eq. 1 is calculated as follows. In order to assign similarity, it is considered how much correspondence exists between the recognized object and its estimated pose and real one, respectively. In probabilistic terms, the goal of the method according to the present embodiment is to estimate an object pose which yield the best interpretation of object pose generated by multiple features in Bayesian sense. According to the particle filter based probabilistic method of the present embodiment, the similarity weight $w_j$ approximates variant of posterior distribution of Eq. 4.

$$w_j = p(O_{t,Object}|E) = p(O_{t,id}, O_{t,pose}|E) \qquad \text{Eq. 4}$$

$O_{Object}$ denotes an object to recognize. The $O_{Object}$ is divided into $O_{id}$ and $O_{pose}$ for information about object recognition and pose estimation, respectively. The $O_{id}$ means whether recognized object is correct or not, and $O_{pose}$ means a precision level of an estimated object pose. E denotes evidence measurement, and redefined $E=\{Z_1, Z_2, \ldots, Z_n\}$ indicates multiple features. In order to represent similarity weight, since object identification is considered separately as pose estimation, it is assumed that the $O_{id}$ and $O_{pose}$ are independent events. That means that the very well recognized object does not guarantee accurate estimation of object pose, vice versa. According to this assumption, the similarity weight can be expressed as Eq. 5.

$$p(O_{t,id}, O_{t,pose}|E) = p(O_{t,id}|E)p(O_{t,pose}|E) \qquad \text{Eq. 5}$$

A procedure of calculating the similarity weight according to a type of a feature will be described hereinafter.

In case of generating an object pose using SIFT feature at the step S101, the similarity weight $w_j$ can be expressed as Eq. 6 from Eq. 5.

$$w_j = p(O_{t,Object}|E_{SIFT}) = p(O_{t,id}, O_{t,pose}|E_{SIFT}) \qquad \text{Eq. 6}$$
$$= p(O_{t,id}|E_{SIFT})p(O_{t,pose}|E_{SIFT})$$

Figure 4:
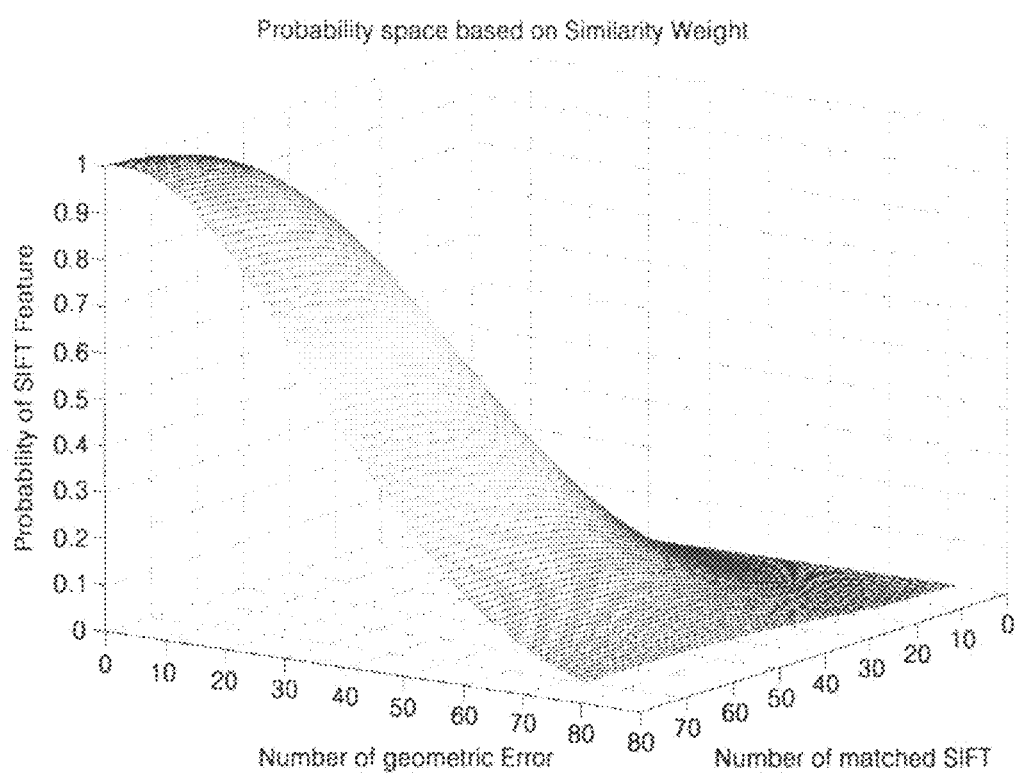
FIG. 4 is a graph of $P(O_{t,Object}|E_{SIFT})$ obtained according to an embodiment of the present invention.

The object pose may be generated by calculating transformation between SIFT features measured from a current frame and corresponding features of database model. The transformation is expressed by a homogeneous transform matrix. When one scene has several candidates that have matched SIFT features, 3D poses are generated from all of the candidates for probabilistic fusion in particle filtering process. However, in order to assign similarity weight to each of the candidates, posterior distribution is calculated from Eq. 6. In Eq. 6, $p(O_{t,Object}|E_{SIFT})$ is calculated using a sigmoide function based on the number of matched SIFTs through measurement. $p(O_{t,pose}|E_{SIFT})$ is defined as an average distance error. FIG. 4 is a graph showing probabilistic distribution obtained through Eq. 6 when an average measurement value of the number of matched SIFT number is 23 and the average distance error is 5 mm with certain variation by many trials.

In case of generating an object pose using line feature in the step S101, the similarity weight $w_j$ can be expressed as Eq. 7 from Eq. 5.

$$w_j = p(O_{t,Object}|E_{Line}) = p(O_{t,id}, O_{t,pose}|E_{Line}) = p(O_{t,id}|E_{Line})p(O_{t,pose}|E_{Line}) \qquad \text{Eq. 7}$$

In order to calculate the similarity weight for line feature, two kinds of hypothesis are made for object identification $p(O_{t,id}|E_{Line})$ and pose accuracy $p(O_{t,pose}|E_{Line})$. That is, the object identification $p(O_{t,id}|E_{Line})$ is defined as coverage that denotes how many matched line with information of model line. The higher the coverage is, the higher the probability of identifying the object becomes. The coverage can be calculated by Eq. 8.

Coverage=Matched_line_length/Total_line_length_of_model  Eq. 8

Figure 5:
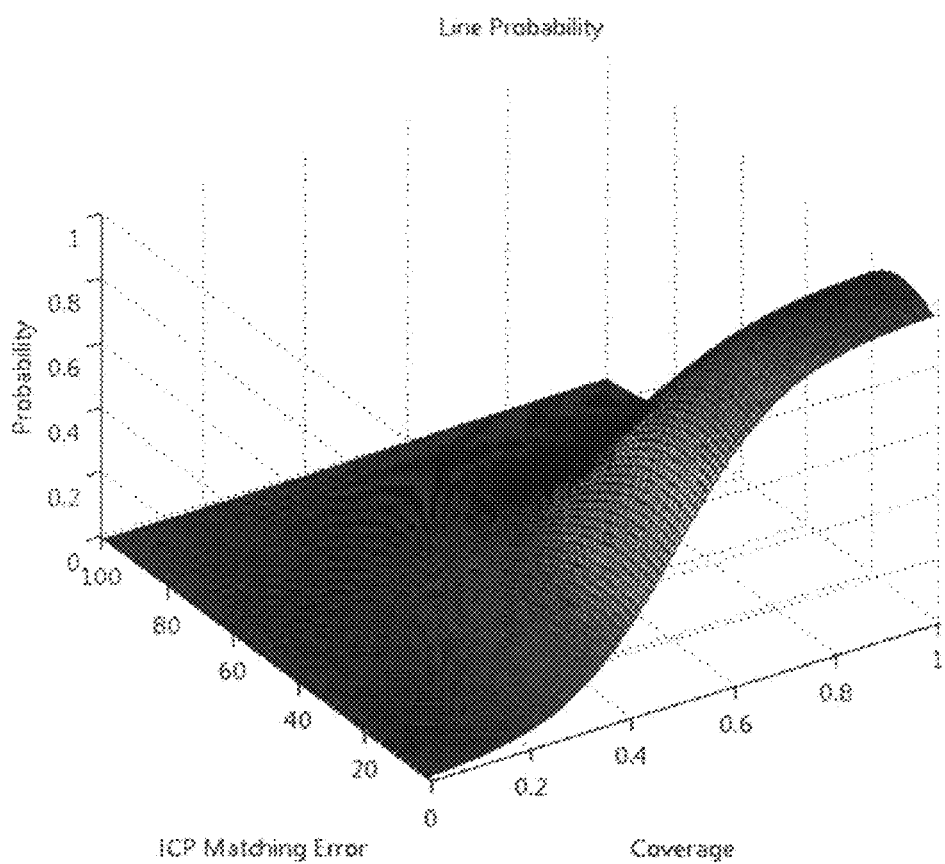
FIG. 5 is a graph of $P(O_{t,Object}|E_{Line})$ obtained according to an embodiment of the present invention.

The pose accuracy $p(O_{t,pose}|E_{Line})$ is defined as a matching error. For example, pose accuracy $p(O_{t,pose}|E_{Line})$ may be an iterative closest point (ICP) matching error in case of using ICP as a line matching algorithm. Like SIFT, line matching finds several matched sets in a single scene. So, $p(O_{t,Object}|E_{Line})$ can be obtained by Eq. 8 for each candidate and is represented as a joint probability in FIG. 5.

In case of generating an object location using color feature at the step S101, the similarity weight $w_j$ is expressed in consideration of the number of colored pixels matched with model or as a predefined constant. In case of color feature, the similarity weight is set to have a comparatively smaller value than the similarity weight of the object pose generated by other features.

Then, Eq. 9 shows a probabilistic distribution of particles denoting an estimated object pose at a time t through the second step S2-2.

$$O_t^{[i]} \sim p(O_t | O_{t-1}^{[i]}, u_t), (i=1,\ldots,k) \quad \text{Eq. 9}$$

In Eq. 9, k is the number of particles, $O_{t-1}^{[i]}$ is particles that represent object pose at a time t−1, and $u_t$ denotes camera motion control between a time t−1 to a time t.

That is, particle distribution denoting object pose at a time t is estimated by propagating particles denoting object pose at a time t−1 using camera motion information $u_t$. Then, weights are assigned to each of the particles denoting an estimated object pose using observation likelihood of Eq. 1.

Finally, updated estimated particles are re-sampled according to the particle's weights in the third step S2-3. That is, particles having different weights fused in the second step S2-2 are re-distributed to particles having a uniform weight. As the times of updating posterior distribution increase, particles are gradually concentrated to a single estimated location and pose.

The real time environment monitoring unit 200 receives real time image information from the image capturing unit 100 and the generated object pose and location information from the probabilistic information fusion unit 500, generates a region of interest (ROI), and collects and calculates real time environmental information in the step S201. The calculated real time environmental information includes illumination, texture density, a distance between a robot and the target object in the ROI. Here, the calculated illumination and texture density are expressed as a comparative value for environment variation, not a real value.

Figure 6:
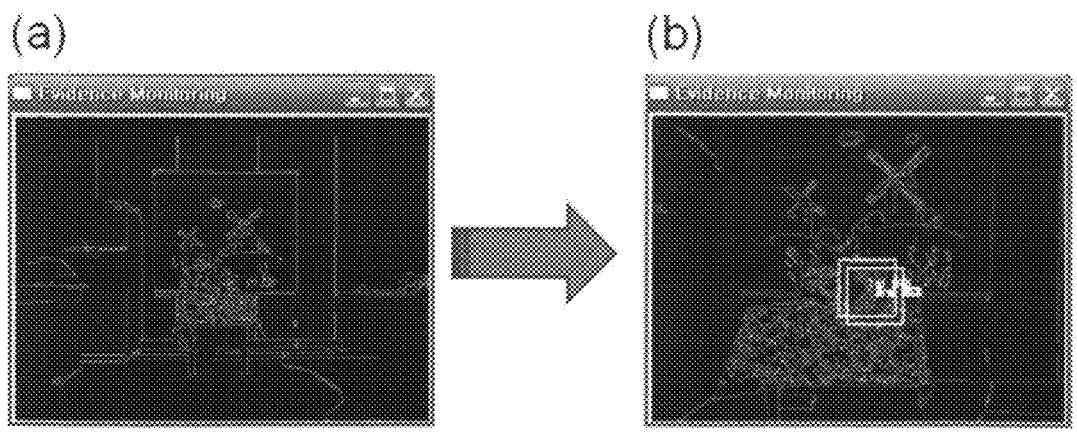
FIG. 6 is a diagram illustrating an in-situ monitoring method according to an embodiment of the present invention.

If a robot does not have any information about a region of the target object as shown in a diagram a) of FIG. 6, the robot needs to inspect all possible regions. However, if the robot has information about an approximate location of the target object as shown in a diagram b) of FIG. 6, it is more effective to observe candidate regions. The process of real time environment monitoring can be performed as follows. At first, the real time environment monitoring unit 200 receives 2D image and 3D point cloud data and recognition result of the step S102, generates a canny edge image based on the 2D image, and obtains data about intensity using HSI color space. Then, the real time environment monitoring unit 200 observes overall region and monitors environment variation. If a recognition result is provided from the step S102, the real time environment monitoring unit 200 generates the ROI using previous particles. If not, the real time environment monitoring unit 200 returns to the previous step for observing overall region and monitoring environment variation. Then, the real time environment monitoring unit 200 calculates texture density, illumination, and average values of the distance in the ROI. The above described steps are repeated until the robot finishes recognition mission.

The illumination means intensity information in the current image. The illumination is calculated as a comparative value, not an absolute value, such as environmental variation. In each region, the texture density is considered as a pixel processed by a canny edge image of the current frame. And, the distance of each region is calculated using the image pixel processed based on valid 3D point cloud data and the average value thereof. For example, an input image is uniformly divided into 25 regions by 5 columns and 5 rows, and illumination, texture density, and distance are calculated for each region.

In the step S202, the evidence selecting and collecting unit 400 probabilistically selects evidence or a set of evidences using values calculated in the step S201. That is, the evidence selecting and collecting unit 400 selects best evidence for object recognition and pose estimation using the collected information about illumination, texture density, and distance between a robot and the object in the ROI in the step S201.

In the present embodiment, it is assumed that valid features for identifying object in the current scene are previously defined at the evidence selecting and collecting unit 400. For example, the information may be transferred from the service robot information system (SRIS). The evidence selecting and collecting unit 400 selects M (M<N) features in a view of validity and efficiency among N proper features as evidences to be used for object recognition if all of N features cannot be applied because N is excessively large. If probabilistic distribution information for object pose is not provided initially, a scene obtained by a robot camera based on texture density, illumination, and distance is used to decide an optimal feature set as a whole. After obtaining probabilistic distribution of object pose, the robot moves to a location with high probability. In this case, an optimal evidence set is decided based on texture density, illumination and distance information in a scene with weights assigned based on the object probabilistic distribution.

In detail, Bayesian theorem based probabilistic algorithm is used to select proper evidence in the present embodiment.

The best evidence is an evidence having the highest probability P(Object|Evidence) of having a corresponding evidence when the object exists. However, it is not easy to directly calculate P(Object|Evidence) in general. In the present embodiment, the Bayesian theorem is used to calculate the probability P(Object|Evidence). In order to assign probability, it is considered how much correspondence between the recognized object and its available evidence for recognizing exists. In a probabilistic term, the goal of the method according to the present embodiment is to evaluate evidence which yield the best interpretation of evidence generated by proposed hypothesis in Bayesian sense. Each of probabilities used for generating candidates of object recognition using the Bayesian theorem is calculated using Eq. 10.

$$P(\text{Object} | \text{Evidence}) = \frac{1}{1 + \frac{P(\text{Evidence} | \overline{P(\text{Object})}) \cdot P(\overline{\text{Object}})}{P(\text{Evidence} | \text{Object}) \cdot P(\text{Object})}} \quad \text{Eq. 10}$$

In Eq. 10, P(Evidence|Object) denotes a probability of having corresponding evidence when a current scene includes the object (positive information), P(Evidence|$\overline{\text{Object}}$) denotes a probability of having corresponding evidence when a current scene does not include the object (negative information), P(Object) denotes a probability of having the object in a predetermined space (prior probability), and P($\overline{\text{Object}}$) denotes a probability of not having the object in the predetermined space.

An important part in Eq. 10 is negative information P(Evidence|$\overline{\text{Object}}$) denoting a probability of having a corresponding evidence when a target object is not in a current scene. At first, the negative information is obtained from experimental data of each evidence when there is no target object. Then, it can be updated by the previous recognition result. More detailed explanation of the negative information will be described in later.

Since the collected information about illumination, texture density, and a distance between the robot and the target object in the step S201 are independent events, the probability P(Evidence|Object) for each evidence such as SIFT, color, and line can be expressed as Eq. 11.

$$P(E|O)=P(E_{distance}|O) \cdot P(E_{texture}|O) \cdot P(E_{illumination}|O) \quad \text{Eq. 11}$$

In Eq. 11, $P(E_{distance}|O)$, $P(E_{texture}|O)$, and $P(E_{illumination}|O)$ for each evidence are calculated by predefined probability distribution of each evidence according to illumination information, texture density information, and information about a distance between the robot and the object. The predefined probability distribution is an experimental probability distribution that is generated for each of evidences, which denotes different characteristics according to variation of environmental information.

Figure 7:
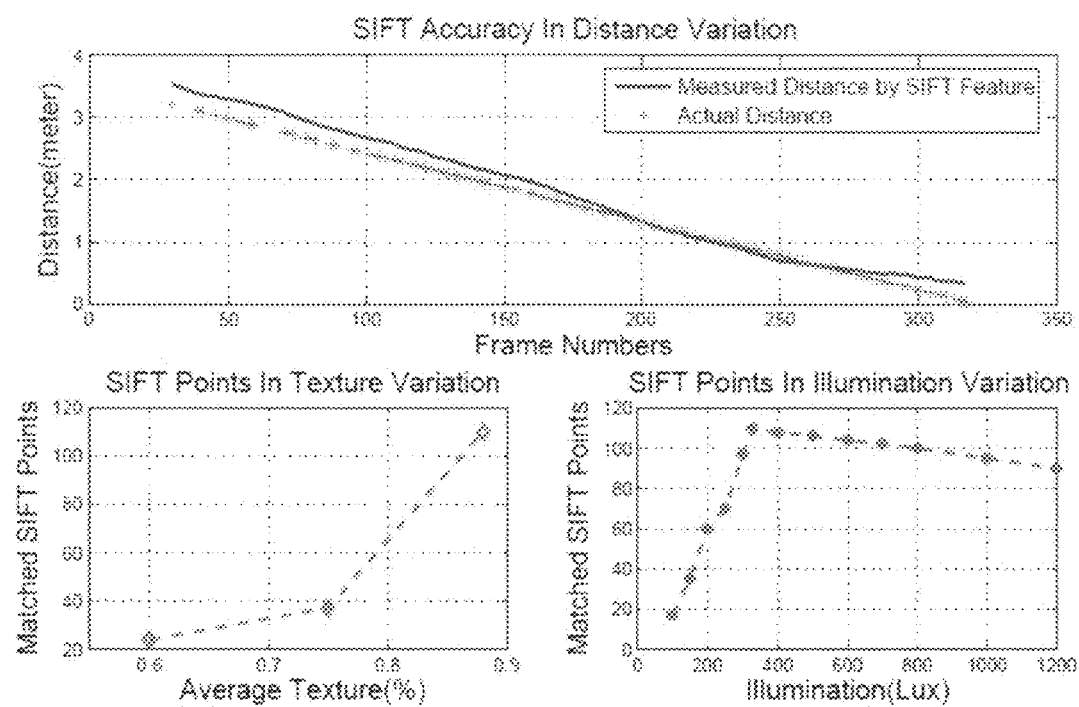
FIG. 7 is a graph showing characteristics of SIFT feature.

At first, the experimental probability distribution for SIFT evidence will be described. The SIFT feature has characteristics as follows. 1) SIFT is sensitive to distance variation. Actually, SIFT matching is 2D matching and this matching algorithm comparatively robust about changes of distance. But, in order to get an accurate object pose, 3D point cloud information is used and 3D matching is tried. It depends on the camera lens size, but 3D point cloud is incorrect relative to the long distance between robot and the target object. Therefore, SIFT feature has weak point in distance changes. 2) The more the target object has texture, the easier the object can be matched with model. 3) SIFT points extraction works best in around 330 Lux illumination condition and the points has decreased from summit. FIG. 7 shows characteristics of SIFT feature based on an experimental result.

Figure 8:
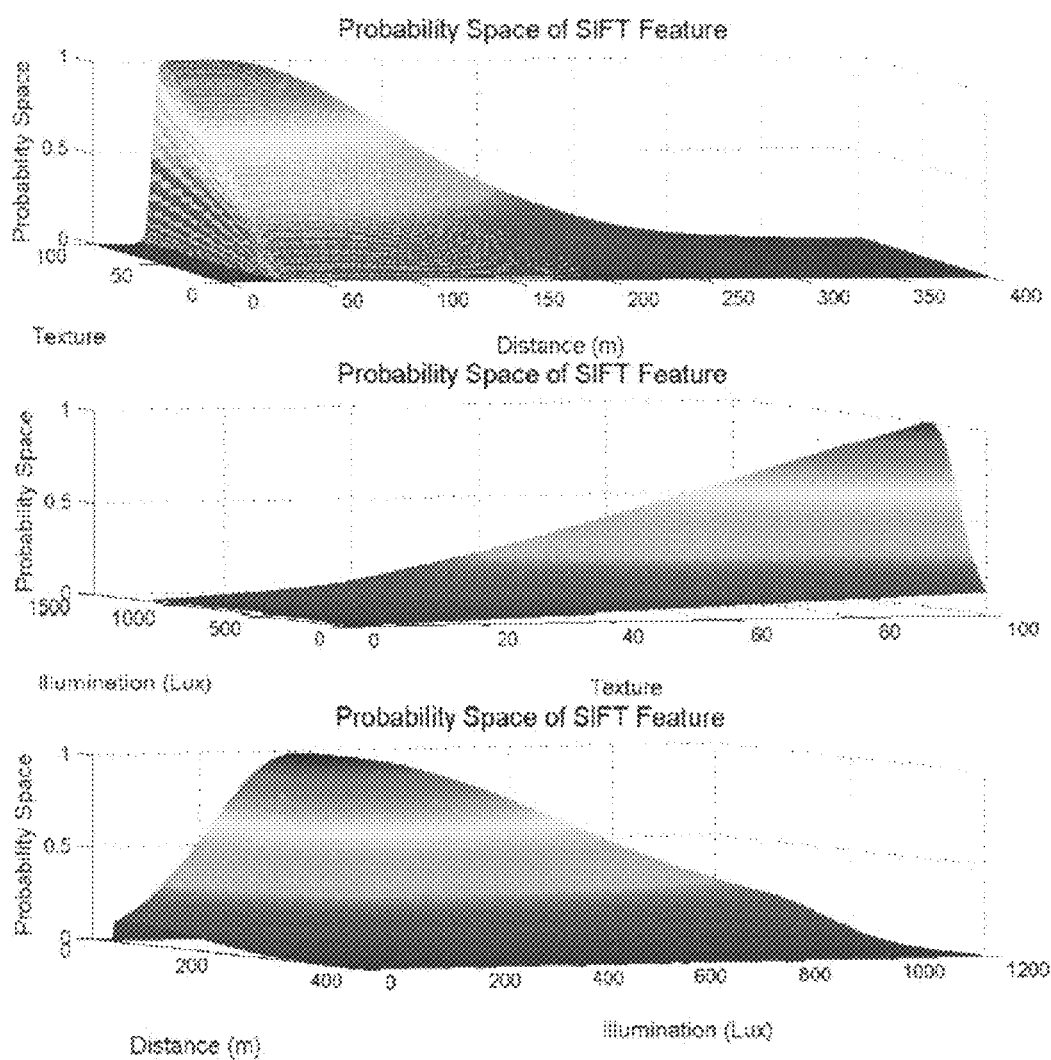
FIG. 8 is a diagram illustrating a probability space of a SIFT feature.

Based on these characters, a SIFT probability model is generated using two functions, a Gaussian function and a linear function. In case of the probability space in distance, the function is a Gaussian function with 0.6 meter means value. It is because a model database is made for SIFT matching with that distance. In addition, the probability space in texture variation is modeled linearly. It is because the more texture there are, the better SIFT features are extracted. Illumination case is very similar to the probability space in distance and its means is 330 Lux that is the best condition to extract SIFT feature based on experiments. To obtain entire probability of SIFT, each sub probability is multiplied consecutively because each are independent as Eq. 11. FIG. 8 shows a probability space of SIFT feature according to changes of environment.

Figure 9:
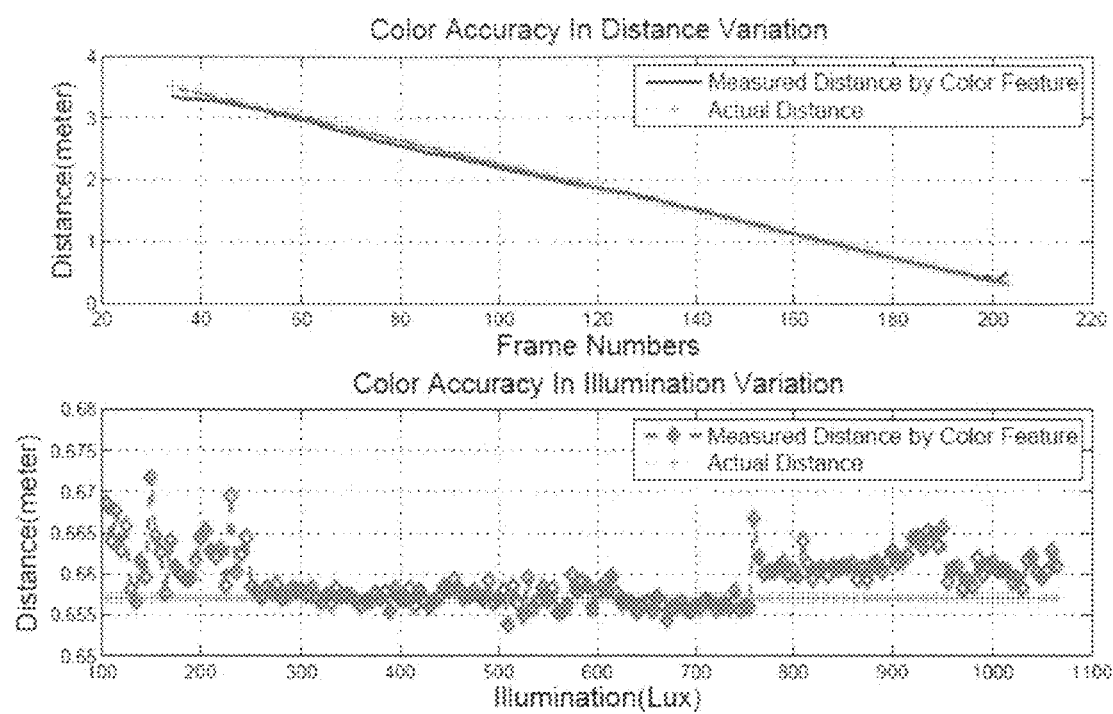
FIG. 9 is a graph illustrating characteristics of a color feature.

Hereinafter, the experimental probability distribution for color feature will be described. The color feature is influenced only by variation of a distance and illumination regardless of texture. If there are no color similar to that of the target object, color feature is robust to distance variation. The accuracy of the color feature shows Gaussian distribution in illumination changes. FIG. 9 shows characteristics of color feature based on experimental result.

Figure 10:
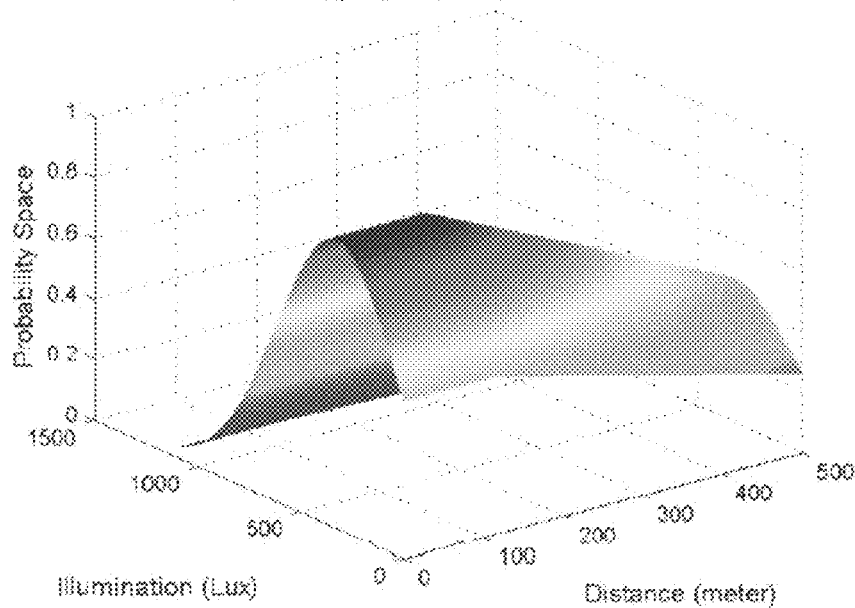
FIG. 10 is a diagram illustrating a probability space of a color feature.

Therefore, the probability space of color feature can be generated using a Gaussian function. The probability space in distance variation is shown as a Gaussian function with 1.0 meter mean value. If a distance is longer than 1.0 meter, the probability values decrease faster than near case. It is because mismatches are often caused by a long distance if there is an object having color similar to that of the target object. Since illumination is not a dominant factor, the probability space in illumination variation is also modeled as a Gaussian function with large variance. In this case, mean value is about 330 Lux. FIG. 10 shows the calculated result of probability space in color feature.

Figure 11:
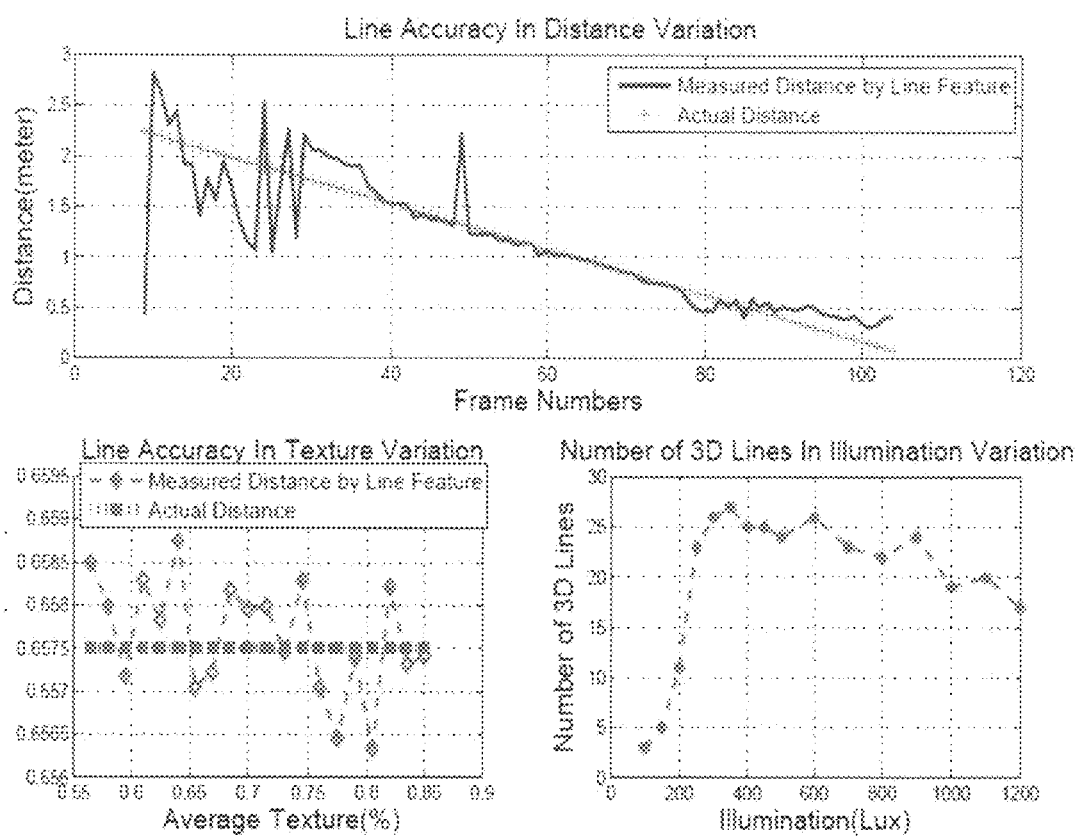
FIG. 11 is a graph illustrating characteristics of line feature.

The experimental probability distribution generated for line feature will be described. Although object identification using line feature is not a perfect method for object recognition and may cause mismatch, the object identification using line feature has been widely applied because of abundance of line feature. Line feature is affected by three environmental factors as follows. 1) If a distance between a robot and a target object is so far or so close, the line feature is inaccurate. A valid distance for line feature is about 1.0 meter. 2) The line feature is not sensitive when an amount of texture is greater than a certain level. 3) The line feature is more sensitive in a dark illumination condition than in a bright illumination condition. FIG. 11 shows characteristics of line feature based on an experiment result.

Figure 12:
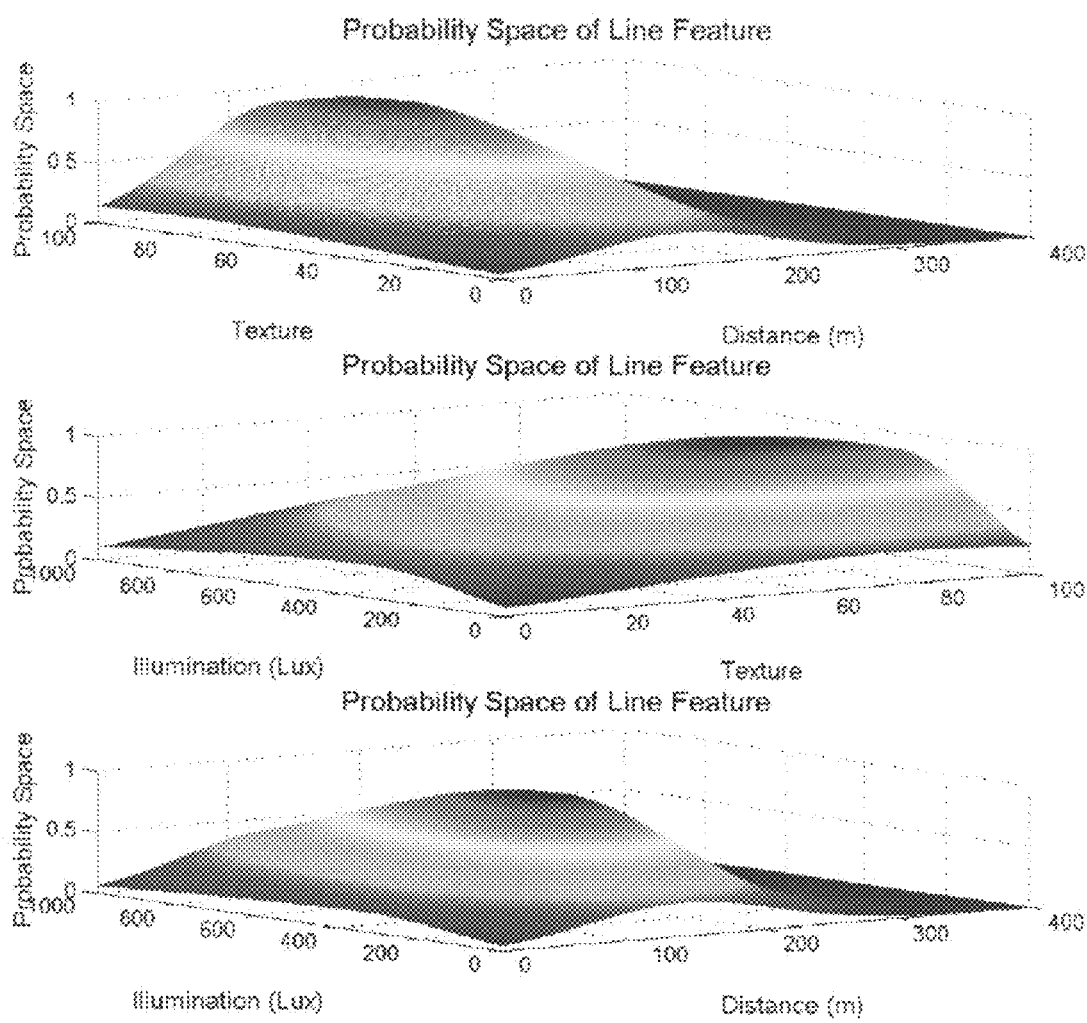
FIG. 12 is a diagram illustrating a probability space of a line feature.

The probability of line feature may be expressed as a Gaussian function. Particularly, if a predetermined space includes texture more than a predetermined level, the line feature has nearly little relationship with texture. Therefore, variance of the line feature should be large enough. FIG. 12 depicts a probability space of line feature.

Extracted evidence may be a combination of two or more features. If the extracted evidence is evidence using a combination of line feature and SIFT feature, the probability distribution of the extracted evidence can be expressed as Eq. 12 because the predefined probability distribution for each feature is an independent event.

$$P(E_{Color+SIFT}|\text{Object})=P(E_{color}|\text{Object}) \cdot P(E_{SIFT}|\text{Object}) \quad \text{Eq. 12}$$

If evidence uses a combination of color feature and line feature, the probability distribution thereof can be expressed as Eq. 13.

$$P(E_{Color+Line}|\text{Object})=P(E_{Color}|\text{Object}) \cdot P(E_{Line}|\text{Object}) \quad \text{Eq. 13}$$

If evidence uses a combination of feature 1, feature 2, and feature 3, the probability distribution thereof can be expressed as Eq. 14.

$$P(E_{Feature1+Feature2+Feature3+\cdots}|\text{Object})=P(E_{Feature1}|\text{Object}) \cdot P(E_{Feature2}|\text{Object}) \cdot P(E_{Feature3}|\text{Object}) \times \quad \text{Eq. 14}$$

Then, $P(\text{Evidence}|\overline{\text{Object}})$ in Eq. 10 is a probability of having a feature of each image in a space with no expected object and is calculated using background texture information and background color information.

In calculating what kind of evidence is best for object recognition P(Object|Evidence), negative information is a sensitive term. However, it is difficult to find a probability of having evidence when no object exists. Therefore, a recognition result at a previous time t−1 is used in the present embodiment.

Figure 13:
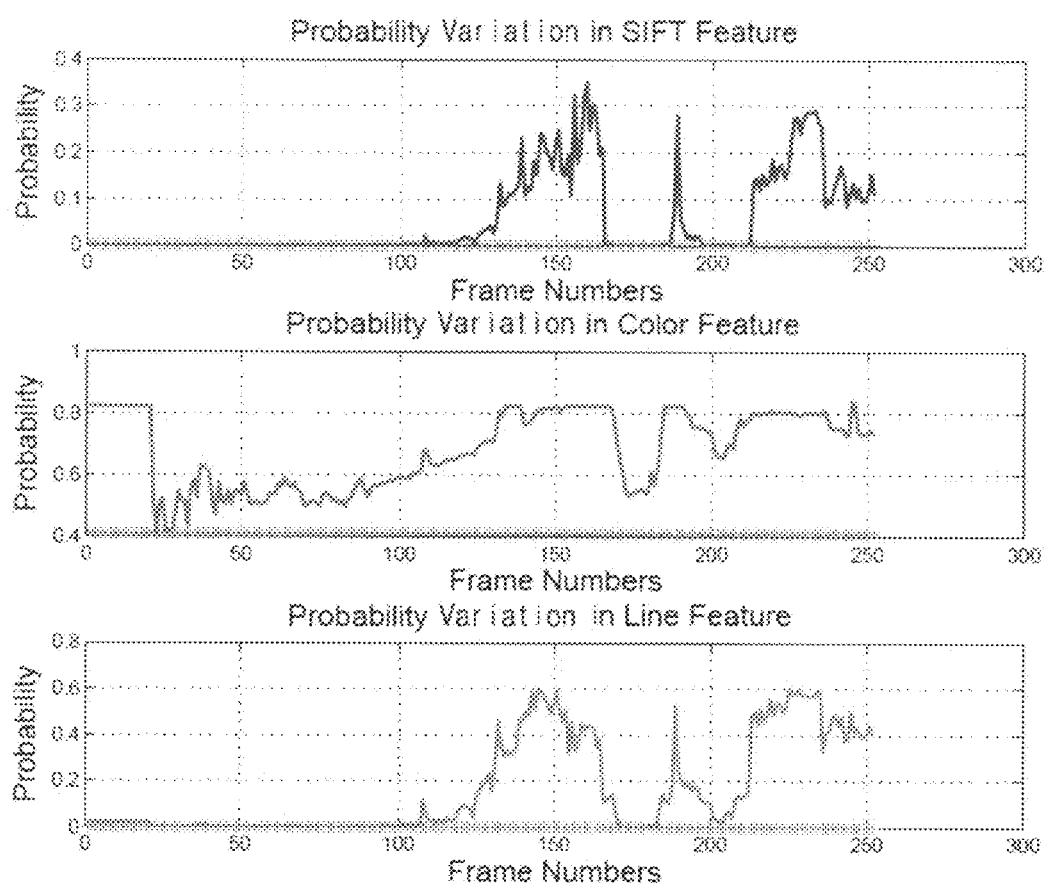
FIG. 13 is a diagram illustrating various characteristics of negative information.

At first, negative information of each feature is obtained using experimental results. For this, a probability P(Evidence|Object) is observed according to variation of environmental factors such as a distance and illumination. An initial value of $P(\text{Evidence}|\overline{\text{Object}})$ is set to a lower bound of P(Evidence|Object). The reason why the initial value of the negative information is set to the lower bound is that the probability is considered as some kind of error in each evidence. Since the probability P(Evidence|Object) is generated using environmental factors, it is possible that the probability P(Evidence|Object) may exist although the object is not in a predetermined space. FIG. 13 shows negative information for each feature. A lower bound of each graph becomes an initial value of negative term in Eq. 10.

Then, the negative term is updated by a previous recognition result which is a probability of a time t−1. The negative term is updated as follows. When the evidence selecting and collecting unit 400 selects the best evidence or an evidence set, if a current scene does not include the selected evidence, the negative term of the selected evidence increases. If it is failed to recognize the object and estimate a pose thereof although identification mission is performed using evidence selected at the evidence selecting and collecting unit 400, the negative term increases. Here, the negative information of the image feature used for the selected evidence increases not to excess an upper bound of positive information. For example, if SIFT evidence is selected as the best evidence and if matched SIFT points are not sufficient to recognize, the negative term of the SIFT evidence increases. However, if it succeeds to recognize the object using the selected evidence, the negative term decreases to the initial value. Using a feedback system as described above, it is possible to select the best evidence for robust object recognition and pose estimation.

That is, the evidence selecting and collecting unit 400 transfers the selected evidence or the selected evidence set to the multiple evidence extracting unit 300 in the step S202. The steps S101 and S102 are performed through the multiple evidence extracting unit 300 and the probabilistic information fusion unit 500 thereby performing object recognition and pose estimation by the selected evidence. Here, the recognition result of the step S102 feeds back to the evidence selection step S202 of the evidence selecting and collecting unit 400. As a result, the evidence selecting and collecting unit 400 provides the best evidence or the best evidence set.

Selectively, it is possible to select the best evidence by calculating entropy from the probability P(Object|Evidence) obtained from various evidences.

If it takes a long time to recognize the target object although the best evidence is selected, it may be a good-for-nothing because of time delay for real time object recognition and pose estimation. Therefore, the probability P(Object|Evidence) is improved using a utility function as shown in Eq. 15 in the present embodiment. The utility function is a kind of weighted normalization function with time consumption.

$$P(i) = \alpha \cdot P(Object|Evidence) + (1-\alpha) \cdot (1 - ExpTime_i/MaxTime_i)$$  Eq. 15

In Eq. 15, $\alpha$ denotes a weight for time consumption, ExpTime is a real execution time, and MaxTime is a maximum consumption time based on an experimental recognition result.

If a utility function calculated from Eq. 15 is used, it is possible to calculate entropy for each evidence. The entropy can be expressed as Eq. 16.

$$Entropy(i) = -P(i) - (1 - P(i)) \log_2 (1 - P(i))$$  Eq. 16

If the entropy is used for selecting evidence, it is more efficient for collecting evidence with a robot behavior. For example, if two evidences are present, SIFT and line, and the probability of SIFT is 0.7 and the probability of line is 0.1 then it is more efficient to move to candidate region detecting line feature for removing the candidate region from a robot's point of view (if there is no target object when robot approached the region). Therefore, object recognition and pose estimation can be effectively performed by selecting and collecting evidence having a minimum entropy from the current scene.

Meanwhile, if additional evidence is required because evidence is insufficient in the step S202, the evidence selecting and collecting unit 400 operates to propose a cognitive action of the robot for collecting evidence.

Figure 14:
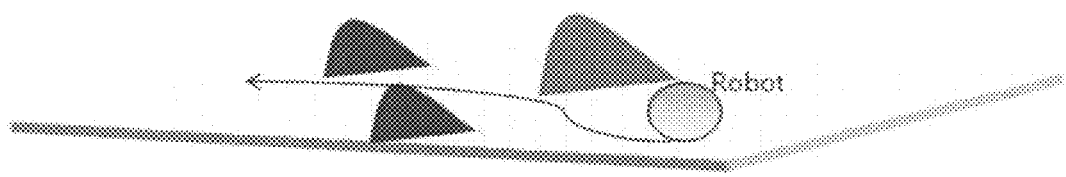
FIG. 14 is a diagram illustrating concept of interaction space for collecting evidence.

For example, a 2D interaction space may be considered for a process for collecting evidence through robot's action. FIG. 14 illustrates the concept of an interaction space for active evidence searching. After inserting the calculated entropy into the interaction space, the robot approaches evidence that minimizes entropy in the interaction space and searches such evidence. However, if the robot moves using only entropy in the current scene, the movement of the robot will be instable because the information about the current scene is dynamically changed in the real environment. Therefore, entropy values are accumulated in previous interaction spaces, the accumulated entropy values are merged with the current information, and the merged information is used in the present embodiment. In this situation, the previous information is propagated according to the movement of the robot, and the robot finally selects a cell having the minimum entropy and approaches to the selected cell, thereby finding other evidence and recognizing the target object.

As described above, the steps S101 and S102, and the steps S201 and S202 may be performed in parallel. In the step S300, the steps 101 and 102, and the steps S201 and S202 are repeated until results of object recognition and pose estimation are probabilistically satisfied. That is, the steps S101 and S102 and the steps S201 and S202 are simultaneously repeatedly performed until the location and pose of the recognized object are converged to a single pose.

In order to verify the reliability of the method for real time object recognition and pose estimation using in-situ monitoring according to the present invention, two simulations are performed.

The first simulation was performed to recognize a target object according to distance variation at illumination condition of 380 Lux. The target object is a blue color object having rich texture on the front side. In order to simulate a real complex environment, various objects are disposed around the target object. Some of the objects have the same color of the target object, and some has the similar shape. The second simulation was performed to recognize a target object in an occlusion condition. Here, the distance between the robot and the target object was fixed to 80 cm, and illumination was set to 250 Lux. The simulation was performed in a Power Bot-AGV platform having a bumblebee stereo camera, and the illumination in the experiment environment is measured by an illuminator.

In the simulations, total six evidences were used for object recognition and pose estimation. The six evidences are SIFT, color, line, combination of line and color, combination of SIFT and color, and combination of line and SIFT.

Figure 15:
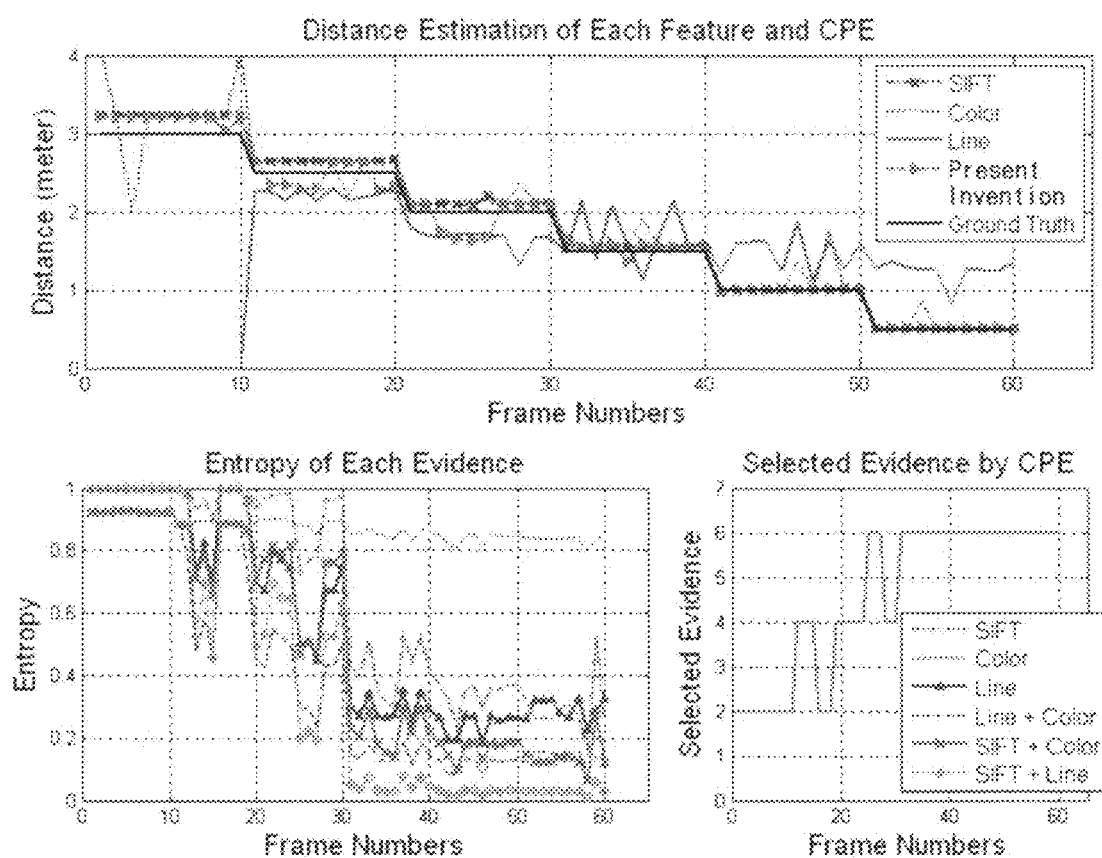
FIG. 15 shows results of first simulations according to distance variation.

FIG. 15 shows a result of the first simulation. In graphs of FIG. 15, X axis denotes the number of frames in a time domain, and Y axis denotes a distance measured using a selected evidence, an entropy of a selected path, and a selected evidence or evidence set. The upper graph of FIG. 15 shows that each of evidences has different characteristics according to the distance between robot and target object. For example, the SIFT feature was accurate in a comparative short distance about 0.5 to 1 m. The line feature was accurate in a distance range of 1 to 2 m, but it is not detected in a distance longer than about 2.5 m. Also, the SIFT feature has some error at a comparative long distance. However, if evidences selected according to the present embodiment are used, accuracy is comparatively high in overall distance range. Meanwhile, two lower graphs of FIG. 15 show a result of selecting evidence based on entropy. As shown, color feature is selected in a comparative long distance, and an evidence with line combined is selected in a middle range distance, and an evidence with SIFT combined is selected in a comparative short distance range.

Figure 16:
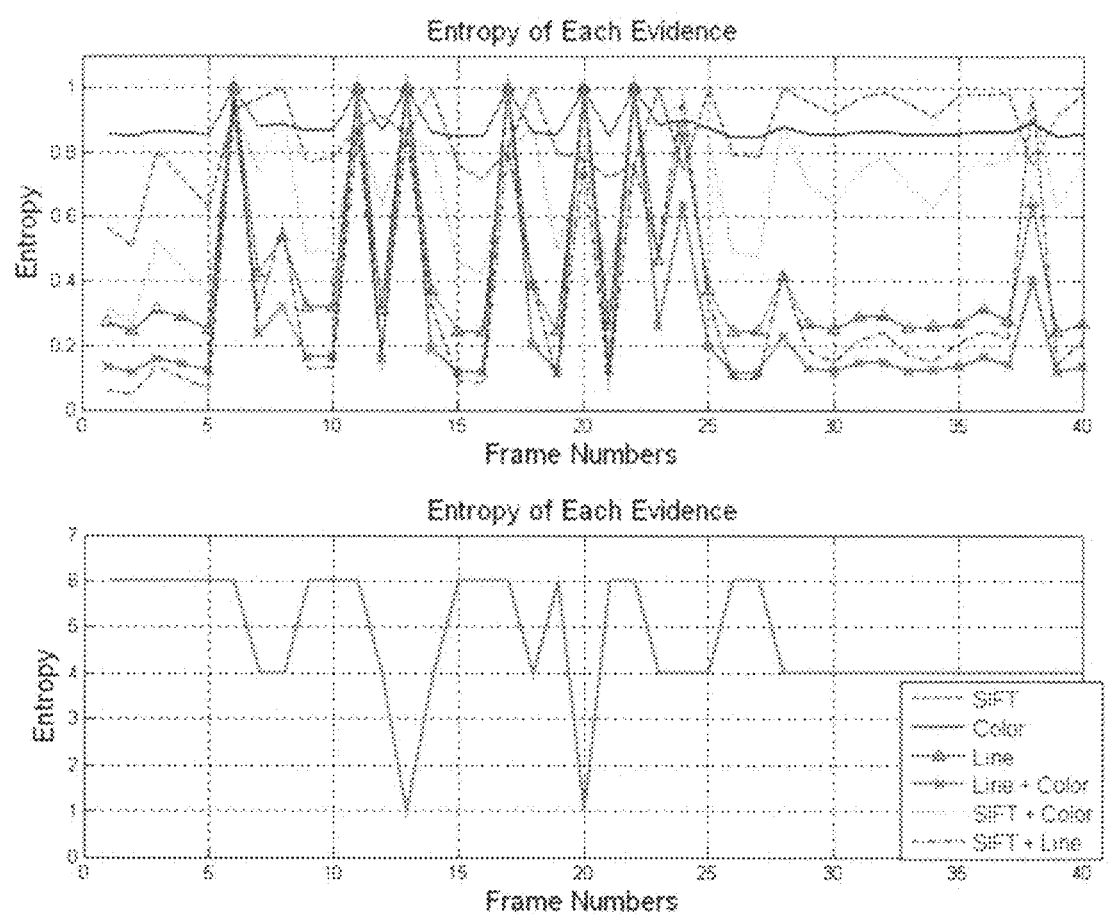
FIG. 16 shows results of second simulations in occlusion condition.

FIG. 16 shows a result of the second simulation. According to the present invention, if a distance is close and illumination condition and texture amount are sufficient like the second simulation, an evidence with SIFT combined is selected at first. However, SIFT feature is not extracted in an occlusion situation. Therefore, SIFT matching fails and negative information of SIFT feature increases until SIFT matching succeeds. Finally, an evidence may be selected using the feedback system according to the present embodiment, and an evidence with line combined is selected as the best evidence after 28 frames as shown in FIG. 16.

As described above, the method and system for real time object recognition and pose estimation according to the present invention automatically select and collect the best evidence using real time continuous images in various view points and based on in-situ monitoring for environmental variation. It is possible to robustly recognize an object and estimate its pose in poor environmental conditions, such as noise, texture, and occlusion.

Also, the method and system for real time object recognition and pose estimation according to the present invention considers matched features and pose errors using Bayesian theorem and probabilistic approaches for allocating similarity weight to each of particles representing a pose of the object. Therefore, it is possible to provide a further systematic identification frame work.

Furthermore, the method and system for real time object recognition and pose estimation according to the present invention admit various evidences such as photometric feature such as SIFT and color and geometric feature such as lines to a particle filtering process. Therefore, it is possible to recognize locations of various objects and to estimate poses thereof each having individual characteristics.

It will be apparent to those skilled in the art that various modifications and variations can be made to embodiments without departing from the spirit or scope of the disclosed embodiments. Thus, it is intended that the present invention covers modifications and variations of this invention provided they come within the scope of the appended claims and their equivalents.

The method and system for real time object recognition and pose estimation according to the present invention automatically select and collect the best evidence using real time continuous images in various view points and based on in-situ monitoring for environmental variation. It is possible to robustly recognize an object and estimate a pose thereof in poor environmental conditions, such as noise, texture, and occlusion.

What is claimed is:

1. A method for real time object recognition and pose estimation using in-situ monitoring, comprising the steps of:
    a) receiving a sequence of 2D real time images or 3D real time images or 2D and 3D real time images from an image capturing unit mounted in a robot, for each of the received 2D or 3D images, extracting single or multiple evidences of a target object to be recognized comparing the extracted evidences with model information, and generating multiple hypotheses or candidates on locations and poses of the target object as probabilistic particles in a space;
    b) probabilistically fusing two or more sets of the multiple hypotheses or candidates on the locations and poses of the target object, which are generated individually from the received real time images and represented as probabilistic particles in the step a), and filtering and updating inaccurate information out of the multiple hypotheses or candidates on the locations and poses through particle filtering, and finally determining a location and a pose of the target object;
    c) generating regions of interest (ROIs) for each of the received real time images based on the multiple hypotheses or candidates on the location and poses of the target object from the step b), and collecting and calculating real time environmental information that includes a distance from each of the generated ROIs to the robot;
    d) selecting probabilistically an evidence or a set of evidences optimal for use in detection based on the generated ROIs and environmental information from the step c), and proposing a cognitive action of the robot for collecting additional evidences, if more evidences are required for a final decision, based on the environmental information from the step c); and
    e) repeating the steps a) and b) and the steps c) and d) in parallel until a result of object recognition and pose estimation is probabilistically satisfied,
    wherein the steps a), b), c), d) and e) are performed by a processor.

2. The method of claim 1, wherein in the step a), the evidence is a feature obtained from image information and a combination of two or more features, where the feature is color, line, and scale invariant feature transform (SIFT).

3. The method of claim 2, wherein in case of using a line feature among extracted evidences, the step a) includes steps of:
    a-1) extracting all of lines from input 2D images;
    a-2) transforming a 2D line to a 3D line by mapping 3D points corresponding to the extracted lines; and
    a-3) generating the multiple hypotheses or candidates on the locations and poses of the object by comparing the 3D lines with 3D line information on the model pre-stored in a database.

4. The method of claim 2, wherein in the step a) if a SIFT feature is used among extracted evidences, the location and the pose of the object is generated by calculating transformation between the SIFT feature measured from a current frame and a corresponding SIFT feature in a database.

5. The method of claim 2, wherein the evidence is a combination of two or more features, and the step a) includes the step of: generating the multiple hypotheses or candidates on locations and poses of the object by comparing various features extracted from a current input image with features of the model stored in a database.

6. The method of claim 1, wherein the step b) includes the steps of:
    b-1) generating an observation likelihood from the pose generated using various evidences at the step a);
    b-2) estimating particles denoting poses of the object by propagating particles from a previous state using motion information and updating the estimated particles by the observation likelihood; and
    b-3) re-sampling the particles according to a weight for expressing particles with different weights fused in the step b-2) as particles with uniform weights.

7. The method of claim 6, wherein in the step b-1), the observation likelihood is generated by an equation:

$$p(Z_t \mid O_t^{[i]}) = \sum_{j=1}^{m} w_j \cdot \exp\left[\frac{-1}{2} \cdot \sum_{i=1}^{4} \left\{ \times S_t^{-1} \cdot \frac{(Ob\_TP_t^j - St\_TP_t^j)^T}{(Ob\_TP_t^j - St\_TP_t^j)} \right\}\right],$$

where $O^{[j]}$ is a homogeneous transform matrix denoting a pose of an object generated from an observation time t, $O_t^{[i]}$ is a homogeneous transform matrix denoting a pose of an object, which is estimated from a time t−1 to a time t, $w_j$ is a similarity weight for $O^{[j]}$ which is a particle generated from a time t, m denotes the number of particles generated at an observation time t, $\{Ob\_TP_1^j, Ob\_TP_2^j, Ob\_TP_3^j, Ob\_TP_4^j\}$ denotes transformed four points expressing $O^{[j]}$, $\{St\_TP_1^i, St\_TP_2^i, St\_TP_3^i, St\_TP_4^i\}$ denotes transformed four points expressing $O_t^{[i]}$, and $S_j$ denotes a matching error covariance for points that express $O^{[j]}$.

8. The method of claim 7, wherein the similarity weight $w_j$ is calculated by an equation:

$$w_j = p(O_{t,Object}|E) = p(O_{t,id}, O_{t,pose}|E),$$

where $O_{t,Object}$ denotes an object to recognize, $O_{t,id}$ means whether recognized object is correct or not, $O_{t,pose}$ means a precision level of an estimated object pose, and E denotes a measured feature.

9. The method of claim 8, wherein if a hypothetical pose of the object is generated using a SIFT feature in the step a) and if $O_{id}$ and $O_{pose}$ are independent events, $w_j$ is calculated by equation:

$$w_j = p(O_{t,Object}|E_{SIFT}) = p(O_{t,id}, O_{t,pose}|E_{SIFT})$$
$$= p(O_{t,id}|E_{SIFT})p(O_{t,pose}|E_{SIFT}),$$

where the $p(O_{t,id}|E_{SIFT})$ is calculated using a sigmoide function based on the number of corresponding SIFTs through measurement, and the $p(O_{t,pose}|E_{SIFT})$ is defined as an average distance error.

10. The method of claim 8, wherein in the step a), if a hypothetical pose of the object is generated using a line feature in the step a) and if $O_{id}$ and $O_{pose}$ are independent events, $w_j$ is calculated by equation:

$$w_j = p(O_{t,Object}|E_{Line}) = p(O_{t,id}, O_{t,pose}|E_{Line}) = (O_{t,id}|E_{Line})p(O_{t,pose}|E_{Line}),$$

where the $p(O_{t,id}|E_{Line})$ is defined by an equation 'Coverage=Mathced_line_length/Total_line_length_of_model' and $p(O_{t,pose}|E_{Line})$ is defined as a matching error.

11. The method of claim 8, wherein if a hypothetical location of the object is generated using a color feature in the step a), the similarity weight $w_j$ is expressed in consideration of the number of color pixels matched with a model or as a predefined constant.

12. The method of claim 6, wherein a probability distribution of particles denoting an object pose at an estimated time t in the step b-2) is expressed as:

$$O_t^{[i]} \sim p(O_t|O_{t-1}^{[i]}, u_t), (i=1,\ldots,k),$$

where $u_t$ denotes camera motion control between a time t−1 to a time t, and k is the number of particles.

13. The method of claim 1, wherein in the step c), a result of the step b) is received, a ROI is generated from an input image, and illumination, texture density, and a distance between a robot and an expected object in the generated ROI are calculated.

14. The method of claim 13, wherein in the step d), a best evidence for object recognition and pose estimation is selected using information about the illumination, the texture density, and the distance between a robot and an expected object, which are collected in the step c).

15. The method of claim 14, wherein in the step d), an evidence having a highest P(Object|Evidence) is selected and the P(Object|Evidence) is calculated by an equation:

$$P(\text{Object}|\text{Evidence}) = \frac{1}{1 + \frac{P(\text{Evidence}|\overline{P(\text{Object})}) \cdot P(\overline{\text{Object}})}{P(\text{Evidence}|\text{Object}) \cdot P(\text{Object})}},$$

where P(Evidence|Object) denotes a probability of having corresponding evidence when the object exists (positive information), P(Evidence|$\overline{\text{Object}}$) denotes a probability of having corresponding evidence when the object does not exists (negative information), P(Object) denotes a probability of having the object in a predetermined space (prior probability), and P($\overline{\text{Object}}$) denotes a probability of not having the object in a predetermined space.

16. The method of claim 15, wherein since the collected information about the illumination, the texture density, and the distance between a robot and an expected object in the step c) are independent events, P(Object|Evidence) is calculated by an equation:

$$P(E|O) = P(E_{distance}|O) \cdot P(E_{texture}|O) \cdot P(E_{illumination}|O),$$

where P($E_{distance}$|O), P($E_{texture}$|O), and P($E_{illumination}$|O) for each evidence are calculated by predefined probability distribution of each evidence according to illumination information, texture density information, and information about a distance between a robot and an expected object.

17. The method of claim 16, wherein the predefined probability distribution for each evidence has experimental probability distribution according to illumination information variation, texture density information variation, and variation of an estimated distance between a robot and an object.

18. The method of claim 16, wherein since the predefined probability distribution for each feature is an independent event, a probability distribution for an evidence using a combination of a color feature and a SIFT feature is calculated by an equation:

$$P(E_{Color+SIFT}|\text{Object}) = P(E_{Color}|\text{Object}) \cdot P(E_{SIFT}|\text{Object}),$$

a probability distribution for an evidence using a combination of a color feature and a line feature is calculated by an equation:

$$P(E_{Color+Line}|\text{Object}) = P(E_{Color}|\text{Object}) \cdot P(E_{Line}|\text{Object}), \text{ and}$$

a probability distribution for an evidence using a combination of a feature 1, a feature 2, and a feature 3 is calculated by an equation:

$$P(E_{Feature1+Feature2+Feature3+\ldots}|\text{Object}) = P(E_{Feature1}|\text{Object}) \cdot P(E_{Feature2}|\text{Object}) \cdot P(E_{Feature3}|\text{Object}) \times \ldots.$$

19. The method of claim 15, wherein the P(Evidence|$\overline{\text{Object}}$) (negative information) is a probability of having each feature of image in a space with no expected object and is calculated using background texture information and background color information, and wherein if object recognition and pose estimation fail although object identification mission is performed using selected evidences, the negative information of an image feature used by the selected evidence increases not to exceed an upper bound of positive information so as to feedback a recognition result of a previous state to an evidence selecting and collecting unit in order to enable the evidence selecting and collecting unit to select an evidence proper to a corresponding environment.

20. The method of claim 14, wherein in the step d), an evidence having a minimum entropy value is selected and the entropy is calculated by an equation:

$$\text{Entropy}(i) = -P(i)\log_2 P(i) - (1-P(i))\log_2(1-P(i)),$$

where $P(i) = \alpha \cdot P(\text{Object}|\text{Evidence}) + (1-\alpha) \cdot (1-\text{ExpTime}_i/\text{MaxTime}_i)$ where $\alpha$ denotes a weight for time consumption, ExpTime is a real execution time, MaxTime is a maximum consumption time based on an experimental recognition result, P(i) is an utility function, and P(Object|Evidence) denotes a probability of having the object when the evidence exists.

21. The method of claim 14, wherein if additional evidence is required because collected evidence is insufficient, a cognitive action of a robot is proposed to collect additional evidence by an evidence selecting and collecting unit.

22. A system for real time object recognition and pose estimation using in-situ monitoring, comprising:

an image capturing unit mounted in a robot for capturing continuous images of a target object to be recognized in multiple view points, wherein the continuous images include a real peripheral environment of the target object;

a real time environment monitoring unit for receiving 2D and 3D real time image information from the image capturing unit and calculating and collecting real time environmental information;

a multiple evidence extracting unit for extracting evidences from the real time image information and generating multiple hypothesis or candidates on locations and poses of the target object as probabilistic particles in a space by comparing the extracted evidences with model information, wherein the real time environment monitoring unit generates regions of interest (ROIs) based on the multiple hypothesis or candidates on the locations and poses of the target object, and the real time environmental information includes a distance from each of the generated ROIs to the robot;

an evidence selecting and collecting unit for probabilistically selecting an evidence or a set of evidences optimal for use in detection for the target object and the peripheral environment thereof using the real time environmental information and the model information and proposing a cognitive action of the robot for collecting additional evidences, if more evidences are required for the final decision, based on the environmental information; and a probabilistic information fusion unit for estimating a location and a pose of the target object through particle filtering of the multiple hypothesis or candidates on the locations and poses and expressing the estimated location and pose in arbitrary distribution of particles.

23. The method of claim 1, further including a step of capturing continuous images of the object in multiple view points, wherein the continuous images include a real peripheral environment of the object.

* * * * *